United States Patent Office 3,525,591
Patented Aug. 25, 1970

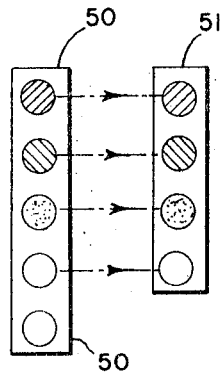
FIG. 6
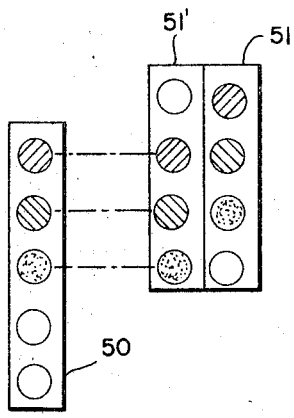
FIG. 7
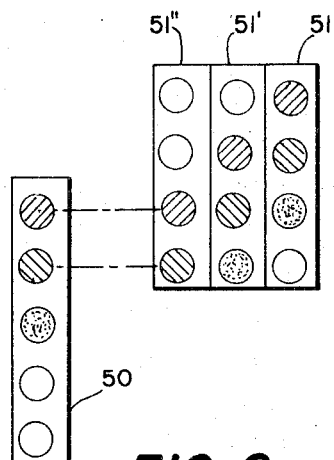
FIG. 8
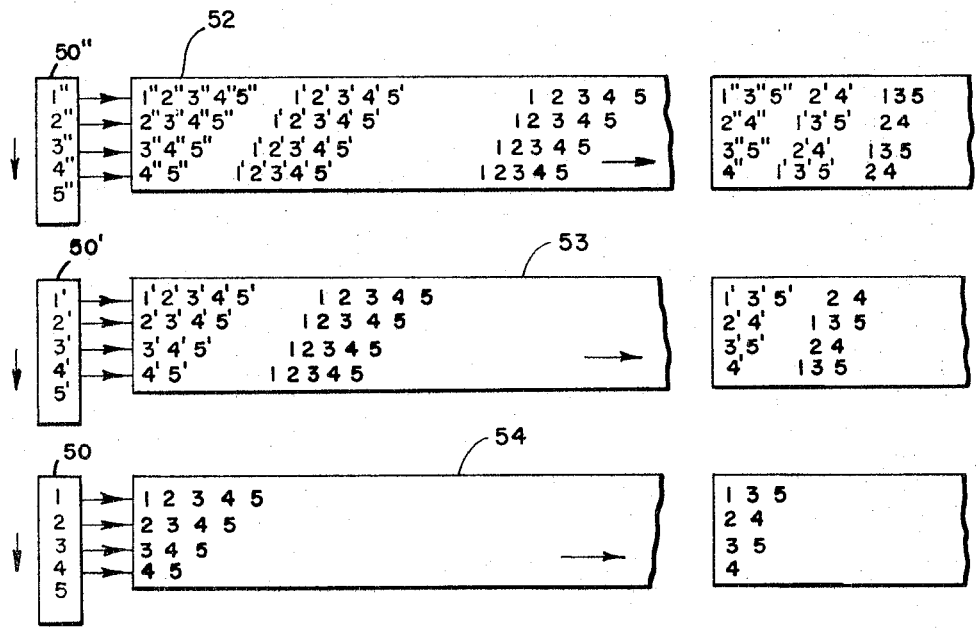
FIG. 9
FIG. 10

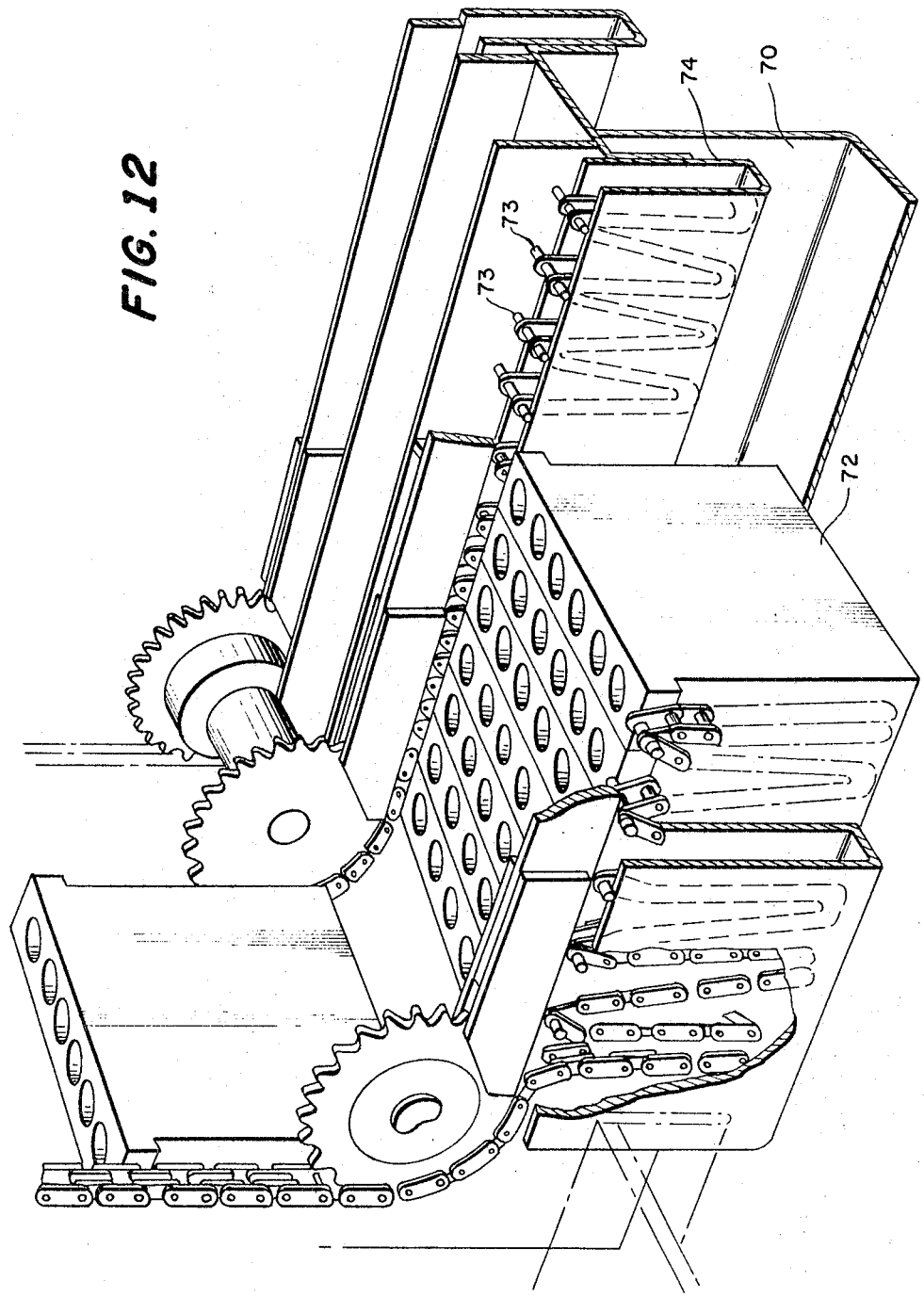

3,525,591
APPARATUS FOR ANALYZING LIQUID SAMPLES
Olof Gunnar Hugo Jungner, Hovas, and Bengt Gosta Ingmar Jungner, Stocksund, Sweden, assignors to AB Autokemi, Stockholm, Sweden, a corporation of Sweden
Filed June 14, 1966, Ser. No. 557,435
Claims priority, application Sweden, June 15, 1965, 7,838/65
Int. Cl. G01n 1/00
U.S. Cl. 23—253
7 Claims

ABSTRACT OF THE DISCLOSURE

Apparatus for simultaneously conducting a plurality of tests upon a plurality of liquid samples in an analyzing device wherein liquid samples are delivered to the analyzing device by placing racks containing the tubes on a first conveyor. The racks are transferred to a second conveyor which is moved step by step. Measured quantities of liquid sample from the tubes are transferred to reaction containers at a plurality of positions along the second conveyor. Measured quantities of reagent are simultaneously delivered to the reaction containers and these containers are then moved through temperature treatment stations and portions of the reacted liquid samples are simultaneously removed. These portions are transferred to test cells and analyzed. The conveyors may be adapted to be folded during the temperature treating step to control the rate of movement of the conveyors through the temperature treatment stations.

---

Figure 1:
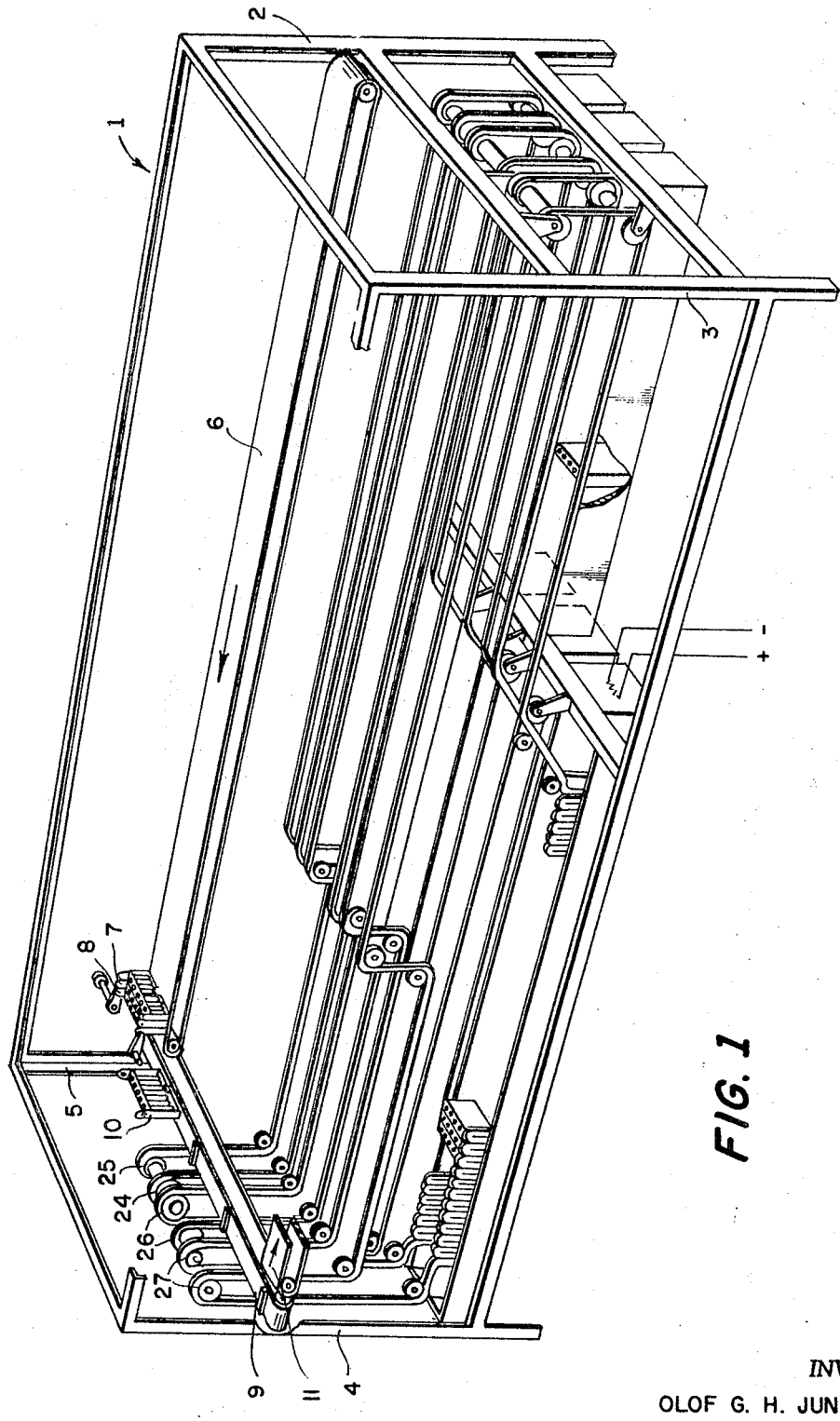

This invention relates to a method and apparatus for automatically analyzing chemical samples and more particularly to a method and apparatus for simultaneously conducting a plurality of chemical tests and for analyzing and reporting the results of such tests.

While the present invention has utility in many fields where it is necessary to provide a method and apparatus for simultaneously conducting a plurality of chemical tests on samples, it finds particular utility in connection with conducting chemical tests on body fluids such as blood, urine and cerebropinal fluid and the advantages of the invention as applied to this particular field are referred to hereinafter.

Heretofore blood analyzing devices have been known and used and such equipment usually comprises a rotary turntable having a plurality of stations. At a first station the sample to be tested is delivered to the sample tube and the tube is then moved to a second station wherein a reagent is added. The particular reagent used depends, of course, on the nature of the test to be conducted. The sample with reagent therein is then moved to subsequent stations where it may be subjected to various temperature treatment for given time periods dependent upon the nature of the test. At a subsequent station the test results are analyzed and the sample holder is then washed and delivered to the initial station for delivery of another sample.

While such rotary analyzing devices have many advantages in automating blood testing techniques, they have inherent disadvantages when large scale testing operations are to be undertaken. In the first place, such rotary devices lack the degree of flexibility necessary where a plurality of tests are to be conducted, particularly where each test requires different temperature treatment for different periods of time. Furthermore, there is a physical limitation on the size to which such devices can be built.

The present invention provides a method and apparatus for simultaneously conducting a plurality of tests on a large number of samples, wherein the tests are conducted under different temperature and time conditions. The apparatus according to the present invention is capable of conducting approximately six thousand tests per hour and may be run continuously on a 24 hour a day, 365 days per year basis if necessary. It is anticipated that a single apparatus according to the present invention, located in a large city hospital, could service not only the requirements of that hospital but also those of smaller hospitals in outlying areas. The capabilities of the presently disclosed method and apparatus are such that periodic blood sampling of the entire population of given areas becomes possible. By such technique many diseases may be diagnosed and treated in the very early stages.

According to the present invention, there is provided a method and apparatus whereby blood samples and the like may be continuously fed to a machine wherein a plurality of independent tests are being simultaneously conducted. A conveyor belt is provided onto which the blood samples to be tested are placed in racks. At the end of the infeed conveyor the racks are transferred to a transverse conveyor. The transverse conveyor moves step by step, each step being approximately equal to the distance between sample tubes. At each step a small quantity of sample is removed and transferred to a reaction container so that a multiplicity of tests may be made in the reaction containers. After the tubes containing the samples have passed across the transverse conveyor and portions of each sample have been removed and transferred to a plurality of reaction containers, the racks containing the sample tubes are removed and transferred to an outfeed conveyor. The tube rack may then be removed, washed and reused.

The transfer from the sample tubes to the reaction containers is effected by means of a plurality of pipettes. These pipettes are operated in unison and move sequentially from a position in the sample tube, out of the sample tube, across to the reaction containers and into the reaction containers to deliver a measured quantity of sample and simultaneously a measured quantity of reagent. The reaction containers are then moved to a position within a heating chamber. The samples with added reagents are heated for a predetermined period at a preselected temperature so that the desired reaction takes place and the containers are subsequently cooled so that the reaction terminates and the reaction products in the containers are passed to a point beneath test cells where the product is removed, tested and the results reported to a computer which prints out the test result data. The reaction containers are subsequently washed and then recirculated to receive fresh samples.

By utilizing independent reaction container conveyors, separate analyzing channels are provided. Thus it is possible to simultaneously conduct different tests requiring substantially different temperature treatments.

An object of the present invention is to provide a method and apparatus for simultaneously conducting a plurality of tests on liquid samples.

A further object of the present invention is to provide a method and apparatus for testing blood samples and the like wherein the tests are automatically conducted simultaneously on a plurality of samples and the results are analyzed and reported by the apparatus.

Figure 2:
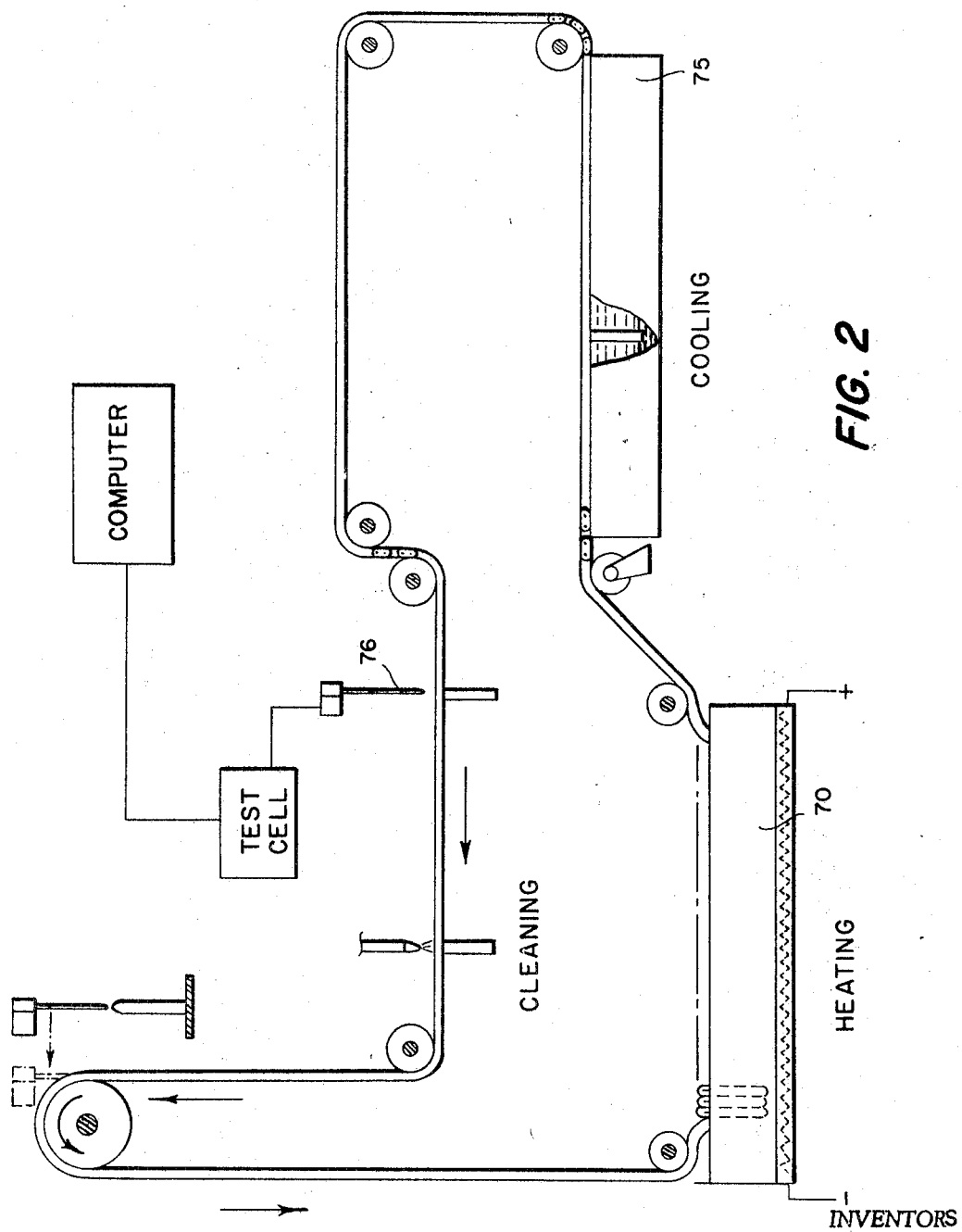
Figure 3:
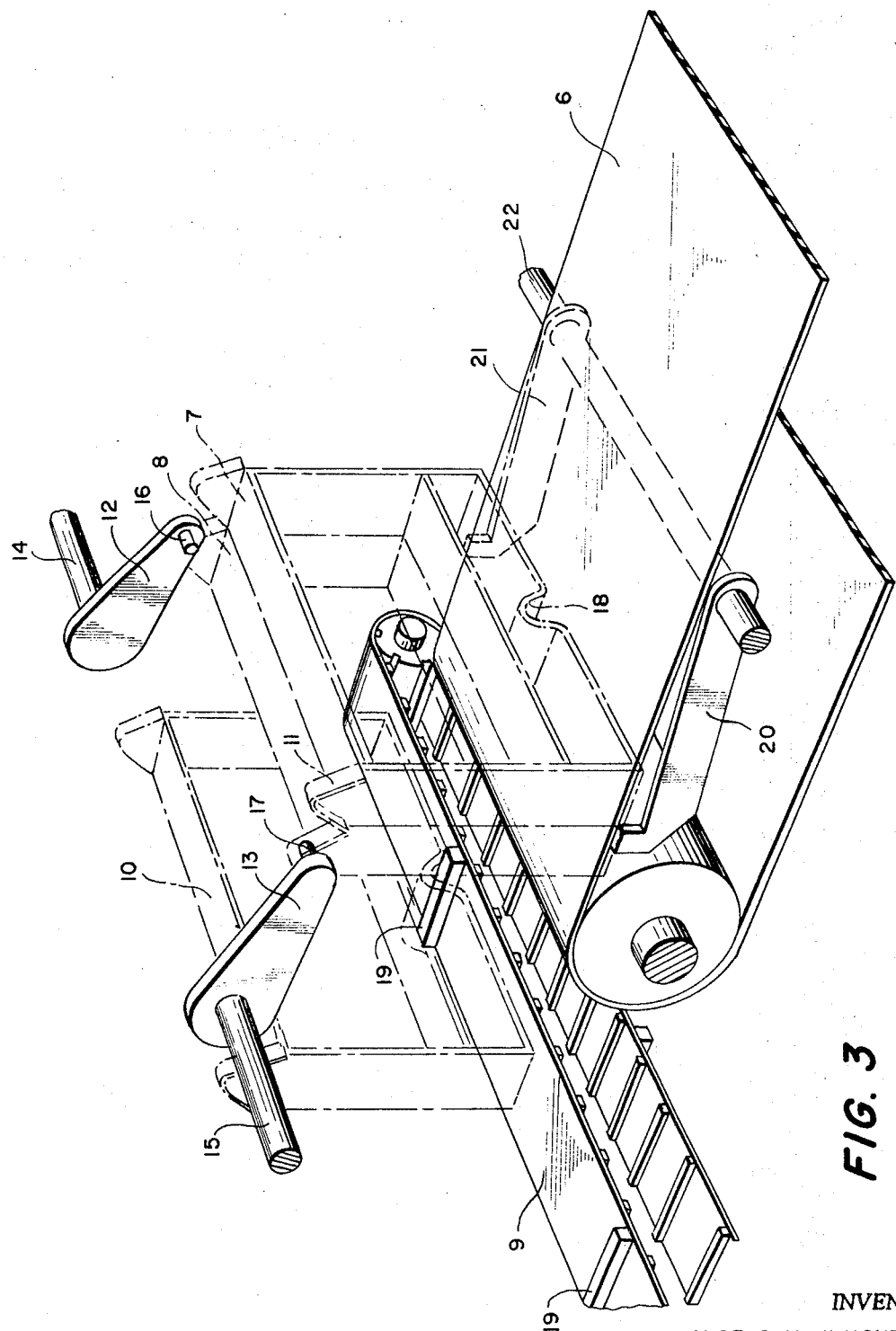
Figure 4:
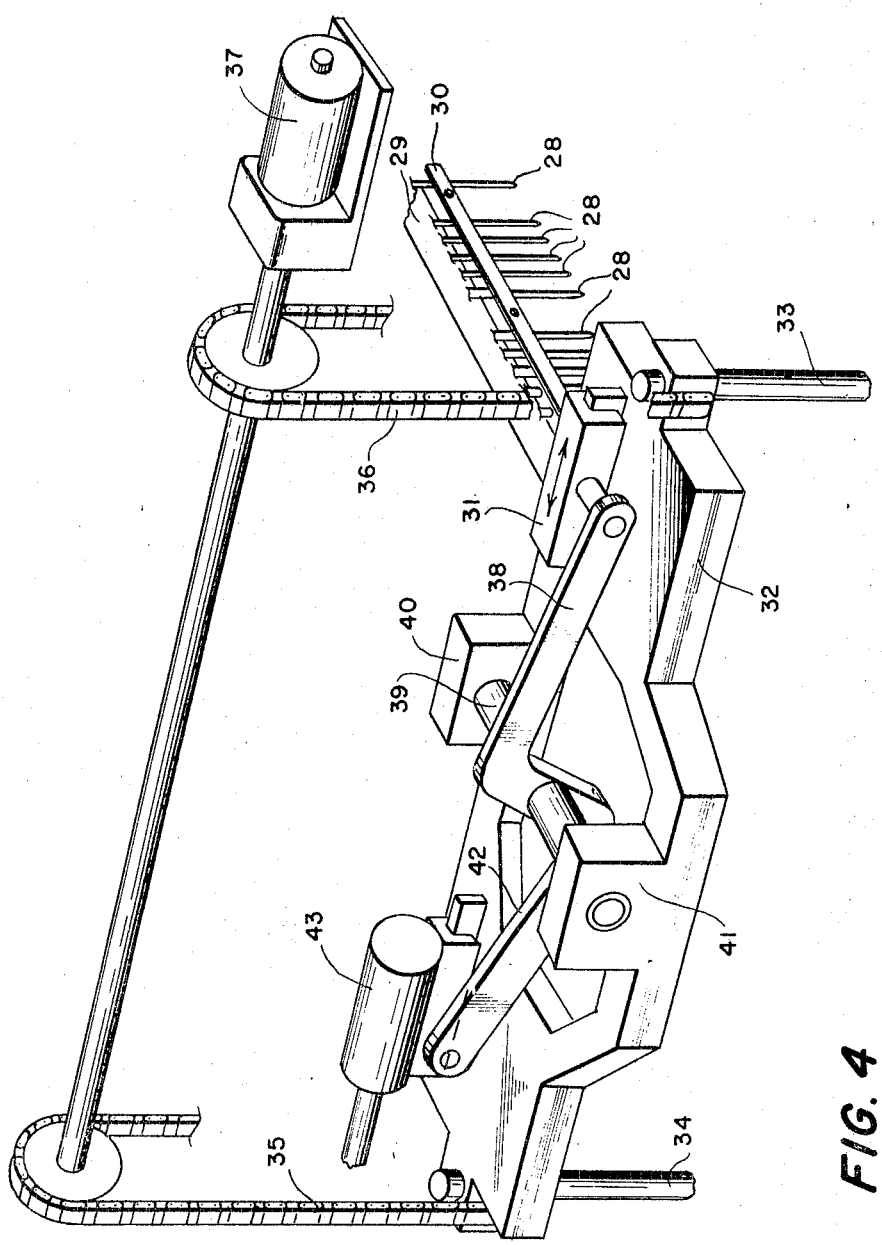
Figure 5:
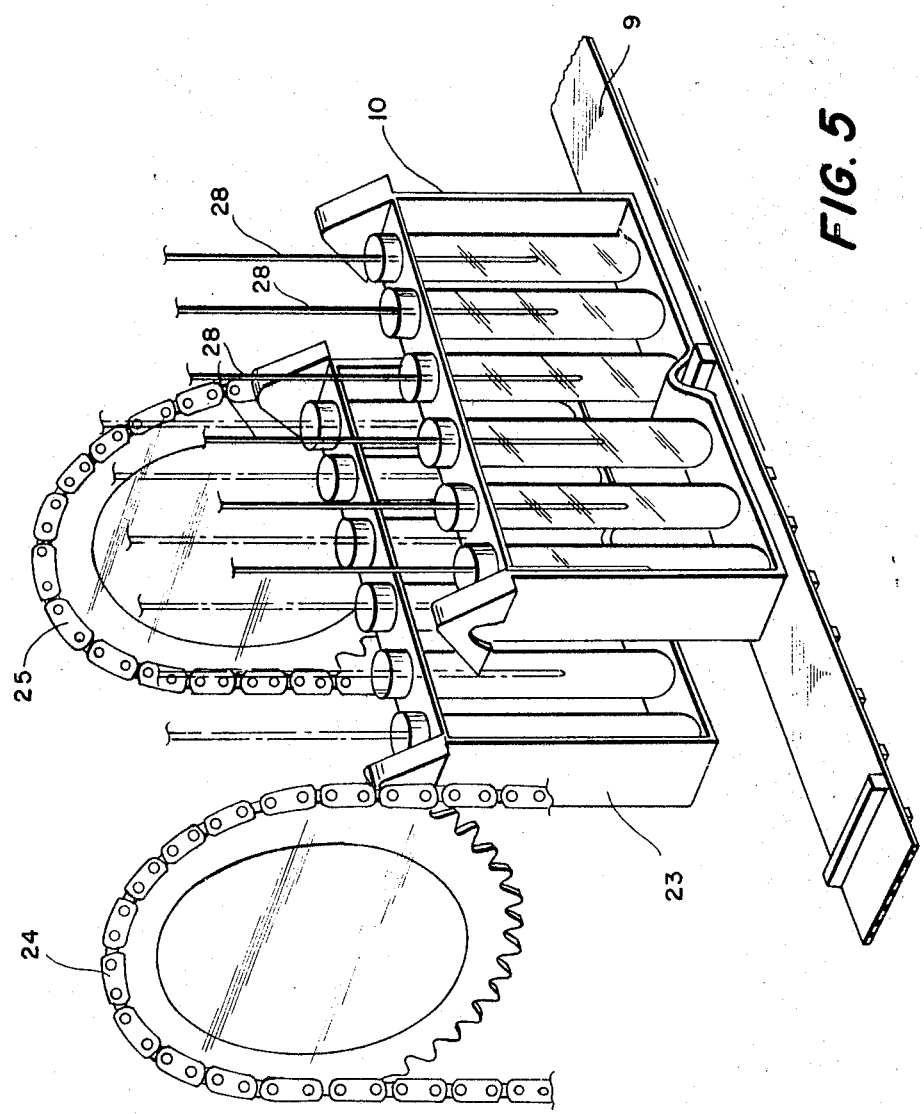
Figure 11:
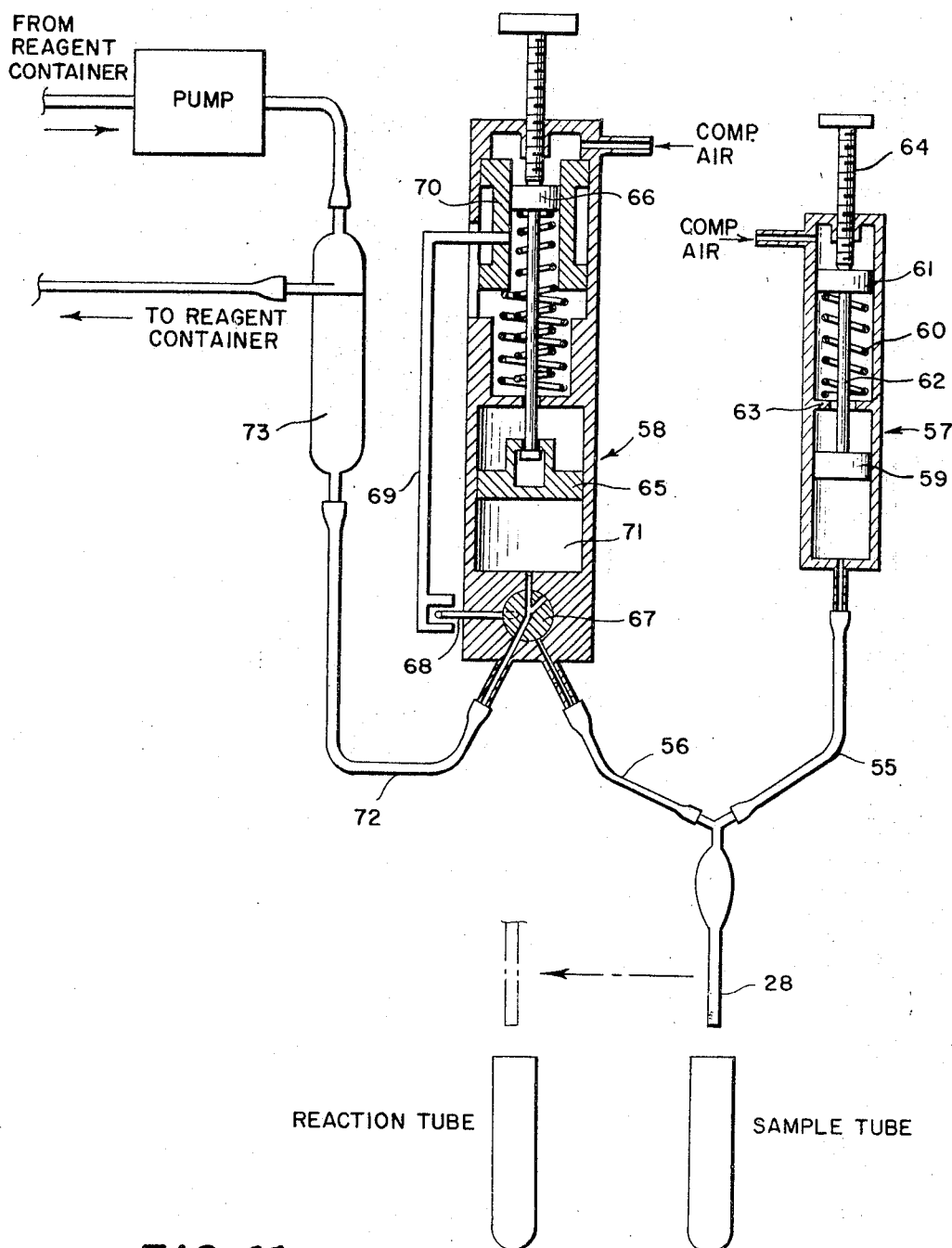

Other objects and many of the attendant advantages of the present invention will become more readily apparent upon consideration of the following detailed specification in connection with the accompanying drawings wherein:

FIG. 1 is a perspective view partly in section showing the arrangement of conveyors, with parts omitted for clarity, FIG. 2 is a diagrammatic elevational view of a conveyor showing the various stations through which the reaction containers are passed, FIG. 3 is a partial perspective view showing the means for transferring the test racks from one conveyor to an adjacent conveyor, FIG. 4 is a partial perspective view of the mechanism for operating the pipettes, FIG. 5 is a perspective view of a portion of the apparatus showing the transfer of liquid from the sample tubes to the reaction containers, FIGS. 6–10 are diagrammatic views showing the transfer of sample from the sample tubes to the reaction containers and the disposition of the samples in the reaction containers, FIG. 11 is a sectional elevational view of the pump means attached to the pipettes for transferring sample from the sample tube to the reaction tubes, FIG. 12 is a sectional perspective view showing the reaction containers in the heating trays.

Referring now more specifically to the drawings wherein like numerals indicate like parts throughout the several views there is shown at 1 in FIG. 1 a frame comprising upright corner supports 2, 3, 4 and 5 which frame together with the rest of the supporting members shown support all of the elements of the analyzing machine. Extending lengthwise at one side of the frame is a conveyor belt 6 upon which may be supported a plurality of racks such as shown at 7 and 8 for supporting sample tubes. The conveyor belt 6 serves as the infeed conveyor and racks containing liquid samples which are to be analyzed are placed on this infeed conveyor 6.

Across one end of the frame there is provided a transverse conveyor 9 and this conveyor transports the racks such as the one shown at 10 across the device to the opposite end where they are transferred to an outfeed conveyor 11. The transverse conveyor 9 moves step by step, each step being approximately equivalent to the distance between the sample tubes on the rack. Normally the transverse conveyor 9 has a continuous line of sample tube racks 10 disposed thereon, with the infeed and outfeed conveyors 6 and 11 respectively driven at corresponding speed so that a rack such as shown at 8 is delivered to the end of the infeed conveyor 6 at the time when space is available on the transverse conveyor 9 and with the outfeed conveyor 11 providing space for the transfer of racks from the transverse conveyor 9 onto the outfeed conveyor at a time when the racks reach the end of the transverse conveyor 9.

In FIG. 3 there is shown in greater detail the means for transferring the racks from the infeed conveyor 6 to the transverse conveyor 9. The racks are shown at 7, 8 and 10 and it can be seen that each rack has a V-shaped upper end portion with an outwardly extending flange 11. A pair of arms 12 and 13 mounted on shafts 14 and 15 respectively have pins 16 and 17 on the outer ends thereof which, upon rotation of the shafts 14 and 15 are adapted to engage the base of the V-shaped groove formed by the outwardly extending flange 11 on each end of each rack. Continued rotation of shafts 14 and 15 will cause each rack to be lifted and transferred from the infeed conveyor 6 to the transverse conveyor 9. It can be seen that the bottom of each rack has a U-shaped bend 18 therein and this bent portion 18 engages an upstanding bar 19 on the transverse conveyor 9. A pair of latches 20 and 21 mounted on shaft 22 serve to engage the end rack and retain it in position until such time as the rack is to be transferred to conveyor 9.

As the racks containing tubes of liquid sample move across the transverse conveyor 9 a plurality of pipettes enter the liquid sample tubes, withdraw a predetermined quantity of liquid sample and transfer this quantity of liquid sample to reaction containers which are disposed in adjacency with the liquid sample tubes. For the sake of clarity the pipettes and associated structure have not been shown in FIG. 1 but are shown in FIGS. 4, 5 and 11. In FIG. 5 it can be seen that the rack 10 has moved with the transverse conveyor 9 to a position where it is disposed directly in front of a set of reaction containers disposed in a reaction container supporting frame 23 which is pivotally mounted on a pair of chain conveyors 24 and 25. Referring to FIG. 1 it can be seen that in addition to the set of chain conveyors 24 and 25 there are additional sets 26 and 27. Each set of chain conveyors has frames containing reaction containers disposed along the entire length of the chains. The purpose in providing multiple sets of reaction container conveyors and the manner in which these reaction container conveyors function will be described more fully hereinafter.

The pipettes are shown in FIG. 5 at 28 and as shown there are six such pipettes, one being disposed in each liquid sample tube. Similarly there are pipettes disposed in the sample tubes situated in front of the reaction container conveyors 26 and 27 so that there may be, for example, eighteen such pipettes in all. All of the pipettes move in unison by the means shown in FIG 4. This means may, for example, be positioned outside of frame 1 of FIG. 1 and to the left thereof as viewed in that figure. FIG. 4 may be correlated with FIG. 5 by noting the positions of the pipettes 28 in the two figures. The pipettes 28 are supported against a block 29 by a bar 30 which is retained tightly against the outer face of the pipettes. The bar 29 is attached to an end block 31 at each end thereof, one end only being shown in FIG. 4. This end block is in turn slidably supported on the upper surface of a frame 32. The frame 32 is vertically slidable on rods 33 and 34 and is moved vertically on these rods by a chain drive 35 and 36 which is connected to the output shaft of a suitable driving motor 37. The end block 31 is connected to a crank arm 38 having the opposite end thereof fixed on a shaft 39 which is journaled in end blocks 40 and 41. This shaft is rotated by means of an offset crank arm 42 which is driven by a piston and cylinder 43. Thus it can be seen that rotation of the shaft 39 through a predetermined angle will cause lateral movement of the bar 29 supporting the pipettes 28. Similarly the pipettes may be moved up and down by proper actuation of the motor 37 to move the supporting frame 32 vertically on the rods 33 and 34. Thus at each step of movement of the transverse conveyor 9 the pipettes 28 are all moved simultaneously into the sample tubes in racks 10, withdraw a predetermined quantity of sample, move upwardly out of the sample tubes, laterally to a position over the reaction containers contained in rack 23 and downwardly into such containers to discharge the sample and a predetermined quantity of reagent. The pipettes then move upwardly out of the reaction containers and laterally to the positions over the sample tubes when the conveyor 9 moves to the next step. As the conveyor 9 moves to the next step, the chain conveyors 24 and 25, 26 and 27 also move so as to bring the next set of reaction containers into adjacency with the sample tubes. This results in an arrangement of transfer from the sample tubes to the reaction containers as illustrated diagrammatically in FIGS. 6–10 inclusive. In these figures for purposes of illustration it is assumed that the sample tube racks contained five tubes whereas the reaction container racks contain four tubes. However, it will be obvious that the same principles apply regardless of the specific number of sample tubes and reaction containers. In FIG. 6 the sample tube rack is shown at 50 and the pipettes transfer measured portions of the sample to the reaction containers which are held in rack 51 as indicated by the arrows in FIG. 6. Different samples are indicated by different crosshatching. In FIG. 7 the sample tube rack 50 has moved one step on the transverse conveyor and a new reaction container rack 51′ has moved into position. When the pipettes transfer sample from the tube racks to the reaction container racks it can be seen that the same sample is displaced one container away from the same sample in the adjacent rack.

In FIG. 8 the sample tube rack 50 has moved still another step and a third reaction container rack 51" has moved into position to receive sample. In FIGS. 9 and 10 there is shown the overall arrangement of samples on the three reaction container conveyors shown at 52, 53 and 54.

In FIG. 11 there is shown diagrammatically the means connected to the pipettes 28 for withdrawing sample and delivering a measured quantity sample and reagent to the reaction tube. Flexible couplings 55 and 56 connect the pipette with pumps 57 and 58. Pump 57 comprises a cylinder having a plunger 59 disposed therein with a spring element 60 acting against a piston 61 connected to plunger 59 by rod 62. The opposite end of spring 60 acts against a plate 63 secured within the cylinder. An adjustable screw 64 extends into engagement with the piston 61 to determine the limit of upward movement of plunger 59. The spring 60 acts against the piston 61 urging it upwardly into engagement with the screw 64. By supplying compressed air to the upper end of the chamber the piston 59 is forced downwardly and by exhausting the upper end chamber to atmosphere the spring 60 acts to force the plunger 59 upwardly. The pump 58 is similarly constructed with a plunger 65 and piston 66. There is also provided a valve 67 which is operated by means of linkage 68 and 69 through a movable sleeve element 70 spring urged to an upper limit position. When compressed air is supplied to the upper end of the cylinder of pump 58 the sleeve 70 is forced downwardly to shift the position of valve 67 and connect chamber 71 to pipette 28. When the compressed air to the cylinder is released the sleeve 70 is forced to its upper limit position and the position of valve 67 shifts to connect chambers 71 through pipe 72 with the reagent container. Reagent is continuously circulated to the reservoir 73 by a pump means and it can be seen that with the valve 67 in the position shown the chamber 71 will be filled with reagent and when compressed air is supplied to the upper end of the cylinder the position of valve 67 will be shifted and the reagent within the chamber 71 will be forced through coupling 56 and pipette 28.

The sequence of steps is as follows: With the pipette 28 in the position shown compressed air is supplied to the upper end of pump 57 so that the plunger 59 is forced downwardly to its lower most position. When the pipette 28 is inserted into the sample tubes the upper end of the chamber 58 is exhausted to atmosphere so that the plunger 59 moves upwardly thus withdrawing the desired quantity of sample from the sample tube into the pipette 28. The pipette 28 moves across to the reaction tube where the plunger 65 is forced downwardly to discharge the measured quantity of sample and the desired quantity of reagent. When the compressed air is released from the upper end of chamber 58 the valve position of valve 67 shifts so as to withdraw reagent from the reservoir 73 into the chamber 71.

Following the transfer of liquid sample from the sample tubes to the reaction containers together with the transfer of suitable reagent to the reaction tubes, the conveyors carry the reaction containers through a series of stations. These are shown diagrammatically in FIG. 2 as the specific details of the structure of these stations forms no part of the present invention. The reaction containers supported on the chain conveyors shown in FIG. 1 are passed first to a heating bath 70 where the sample and reagent are heated for an appropriate period of time and at the proper temperature so that the necessary reaction will take place. The reaction time may be quite substantial and in order to permit the reaction containers to remain in the heating bath a sufficient period of time, yet running the conveyor at a more rapid rate is permitted by the use of a flexible chain conveyor which folds in the manner shown in FIG. 12. It can be seen in FIG. 12 that the reaction container racks 72 are disposed in immediate adjacency in the heating bath 70 with the chain conveyor folded and supported by pins 73 on the upper end of a U-shaped element 74. At the opposite end of the heating bath the chain is unfolded and the reaction container racks assume their normal spaced relation on the conveyor structure.

The reaction containers pass from the heating bath 70 to a cooling chamber 75 wherein the temperature of the reaction containers is brought down to the desired level to terminate the reaction. The reaction containers then pass to a station disposed beneath test cells wherein pipettes 76 move into the reaction containers and withdraw a measured quantity of reacted sample and reagent. This reacted liquid is passed to a test cell, generally comprising a photometer which measures the light transmission and reports the results to a computer. The reaction containers pass on to a cleaning station where they are completely cleaned and made ready for receiving fresh sample.

It can be seen that the presently disclosed apparatus utilizes three separate conveyors for the reaction containers. This permits the use of tests differing widely in temperature and time of treatment. For example, one analytical channel, or reaction container conveyor may be provided with a heating step of 25° C. for a period of 30 minutes, a second analytical channel having a heat treatment to 37° C. for 30 minutes and the third channel to 48° C. for 30 minutes. The temperatures are suitable for certain tests which are normally conducted on the blood. Such tests may include, for example, serum, iron, creatinine, cholesterol, protein bound hexose, sialic acid, enzyme reactions including the transaminases GOP and GPT. Further, certain colloid chemical reactions may be carried out, for example, the thymol turbidity tests and the zinc sulfate reactions. It is readily apparent that the number and type of tests conducted may be widely varied and that further analytical channels may be added to the equipment as required.

It can be seen that it is possible to perform an exceedingly large number of analyses automatically with this equipment so that a large hospital may be provided with a single such unit and run blood tests on all of the patients. Each floor of the hospital may be provided with a unit for repeating the results fed to the computer so that an up to date blood analysis for each patient is immediately available to the attending physician for proper diagnoses and treatment. Because of the large production capacity of the presently disclosed equipment it is possible to provide periodic blood checks for large segments of the population. In this way early diagnoses and treatment of diseases can be effected.

Obviously many modifications and variations of the present invention are possible in light of the above teachings. What is claimed is new and desired to be secured by Letters Patent is:

1. An apparatus for conducting a plurality of tests on each one of a plurality of samples comprising a plurality of sample tubes, a first conveyor for receiving said plurality of sample tubes, said first conveyor adapted to move step by step, each step being approximately equal to the distance between the sample tubes, a plurality of second conveyors including means for permitting folding of said second conveyors transversely to the longitudinal extent thereof, a plurality of reaction containers, racks for said plurality of reaction containers equidistantly spaced on each of said second conveyors and connected to said second conveyors, means for transferring liquid sample from the sample tubes to the reaction containers in each step movement of said first conveyor, said second conveyors moving to bring further reaction containers adjacent the sample tubes in each step movement of said first conveyor, heating trays disposed along the path of said second conveyors for receiving the racks of reaction containers, and means for supporting said equidistantly spaced racks of reaction containers in side by side relation in the heating trays with said second conveyors in the folded positions thereof whereby the racks of reaction containers remain in the heating rays for a greater period of time than the time required for the racks to move an equivalent distance along the remainder of the path of movement of the flexible conveyors, said racks supporting said second conveyors during the time in which the racks remain in the heating trays.

2. An apparatus for conducting a plurality of tests on each of a plurality of liquid samples comprising a plurality of tube racks, a first conveyor for receiving said plurality of tube racks, each rack carrying a plurality of sample tubes; a plurality of second conveyors located along said first conveyor; a plurality of racks connected to and equidistantly spaced along each of said second conveyors, each rack carrying a plurality of reaction containers, means for moving said first conveyor step by step, each step being equal to the distance between the individual sample tubes conveyed by said first conveyor; means for moving said second conveyor step by step and synchronously with the movement of said first conveyor, each step of the movement of each said second conveyor being equal to the distance between the equidistantly spaced racks connected to that conveyor such that a different rack is brought into operative relationship to said first conveyor for each step; transferring means for simultaneously transferring liquid sample from the sample tubes carried by one tube rack to the same number of reaction containers of a rack connected to a said second conveyor in operative relationship to said one tube rack and for simultaneously transferring liquid sample from each of the others of said plurality of racks of sample tubes to corresponding reaction containers in operative relationship therewith; temperature treatment means for the reaction containers disposed along the path of said second conveyors; and test cell means for withdrawing and analyzing the treated liquid samples.

3. An apparatus according to claim 2 wherein said second conveyors include means for permitting folding of said second conveyors transversely to the longitudinal extent thereof and said temperature treatment means comprises heating trays for receiving the racks of reaction containers and means supporting said equidistantly spaced racks of reaction containers in side by side relation in said heating trays with said second conveyors folded therebetween, whereby the racks of reaction containers remain in the heating trays for a greater period of time than the time required for the racks to move an equivalent distance along other parts of the path of movement of said second conveyors, said racks supporting said second conveyors during the time in which the racks remain in the heating trays.

4. An apparatus as claimed in claim 2 further comprising a third conveyor for receiving said tube racks in side by side relation and means for transferring said tube racks from said third conveyor to said first conveyor into a continuous line of tube racks in lengthwise relationship.

5. An apparatus according to claim 2 further including computer means for receiving the analysis of the treated liquid samples and for delivering the results of the analysis.

6. An apparatus as claimed in claim 2 wherein said transferring means comprises a plurality of pipettes, the number of said pipettes being equal to the number of sample tubes of a tube rack and means for simultaneously inserting said pipettes alternatively into the sample tubes and the reaction containers.

7. An apparatus according to claim 6 and further including means associated with the pipettes for delivering reagent to the reaction containers following delivery of the liquid sample.

References Cited

UNITED STATES PATENTS

| 2,534,054 | 12/1950 | Parkes | 198—129 |
| 3,327,535 | 6/1967 | Sequeira | 73—423 |
| 3,193,358 | 7/1965 | Baruch | 23—230 XR |
| 3,193,359 | 7/1965 | Baruch et al. | 23—259 |

MORRIS O. WOLK, Primary Examiner

R. M. REESE, Assistant Examiner

U.S. Cl. X.R.

141—82, 130